United States Patent
Langworthy et al.

(10) Patent No.: US 10,549,597 B2
(45) Date of Patent: Feb. 4, 2020

(54) TWIST BEAM AXLE ASSEMBLY WITH LATERAL ADJUSTABILITY

(71) Applicants: MAGNA INTERNATIONAL INC., Aurora (CA); Kevin Richard Langworthy, Davisburg, MI (US); Sten Ermond Burris, Oxford, MI (US)

(72) Inventors: Kevin Richard Langworthy, Davisburg, MI (US); Sten Ermond Burris, Oxford, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 120 days.

(21) Appl. No.: 15/326,809

(22) PCT Filed: Jul. 15, 2015

(86) PCT No.: PCT/US2015/040475
§ 371 (c)(1),
(2) Date: Jan. 17, 2017

(87) PCT Pub. No.: WO2016/011097
PCT Pub. Date: Jan. 21, 2016

(65) Prior Publication Data
US 2017/0197487 A1 Jul. 13, 2017

Related U.S. Application Data

(60) Provisional application No. 62/026,252, filed on Jul. 18, 2014.

(51) Int. Cl.
*B60G 21/05* (2006.01)

(52) U.S. Cl.
CPC ........ *B60G 21/053* (2013.01); *B60G 21/051* (2013.01); *B60G 2200/21* (2013.01);
(Continued)

(58) Field of Classification Search
CPC .. B60G 21/051; B60G 21/052; B60G 21/053; B60G 2206/203; B60G 2206/202;
(Continued)

(56) References Cited

U.S. PATENT DOCUMENTS 7,556,272 B2  7/2009 Marchel
7,971,888 B2  7/2011 Kim
(Continued)

*Primary Examiner* — Keith J Frisby
(74) *Attorney, Agent, or Firm* — Dickinson Wright PLLC

(57) ABSTRACT

A twist axle assembly (20) of a vehicle includes a pair of trailing arms (22) and a twist beam (24) having a base portion (46) extending along an axis (A) between first and second twist beam ends (42, 44). The twist beam (24) includes a pair of side walls (48) extending downwardly from the base portion (46) and each disposed in spaced relationship with the trailing arms (22). At least one mounting bracket (54) extends from a first mounting bracket end (56) disposed in abutting relationship with a respective trailing arm (22) to a second mounting bracket end (58) disposed in overlaying relationship the side walls (48) of the twist beam (24) for allowing the mounting bracket to axially slip or slide along the side walls (48) of the twist beam (24) and provide for lateral or axial adjustment of the twist axle assembly (20) during the manufacturing process.

15 Claims, 10 Drawing Sheets

(52) U.S. Cl.
CPC ...... *B60G 2200/22* (2013.01); *B60G 2200/23* (2013.01); *B60G 2202/136* (2013.01); *B60G 2202/1362* (2013.01); *B60G 2204/1226* (2013.01); *B60G 2204/1246* (2013.01); *B60G 2206/012* (2013.01); *B60G 2206/201* (2013.01); *B60G 2206/203* (2013.01); *B60G 2206/8201* (2013.01)

(58) Field of Classification Search
CPC .......... B60G 2206/201; B60G 2206/20; B60G 2200/21; B60G 2200/22; B60G 2200/23; B60G 2200/31; B60G 2202/136; B60G 2202/1362; B60G 2204/1434; B60G 2204/1226; B60G 2204/1246
USPC ..................... 280/124.116, 124.166, 124.128
See application file for complete search history.

(56) References Cited

U.S. PATENT DOCUMENTS

| | | |
|---|---|---|
| 2007/0126198 A1 | 6/2007 | Kirkham |
| 2010/0098483 A1 | 4/2010 | Toepker |
| 2012/0211961 A1 | 8/2012 | Zhang et al. |
| 2014/0125025 A1* | 5/2014 | Lee ...................... B60G 21/051 280/124.1 |

* cited by examiner

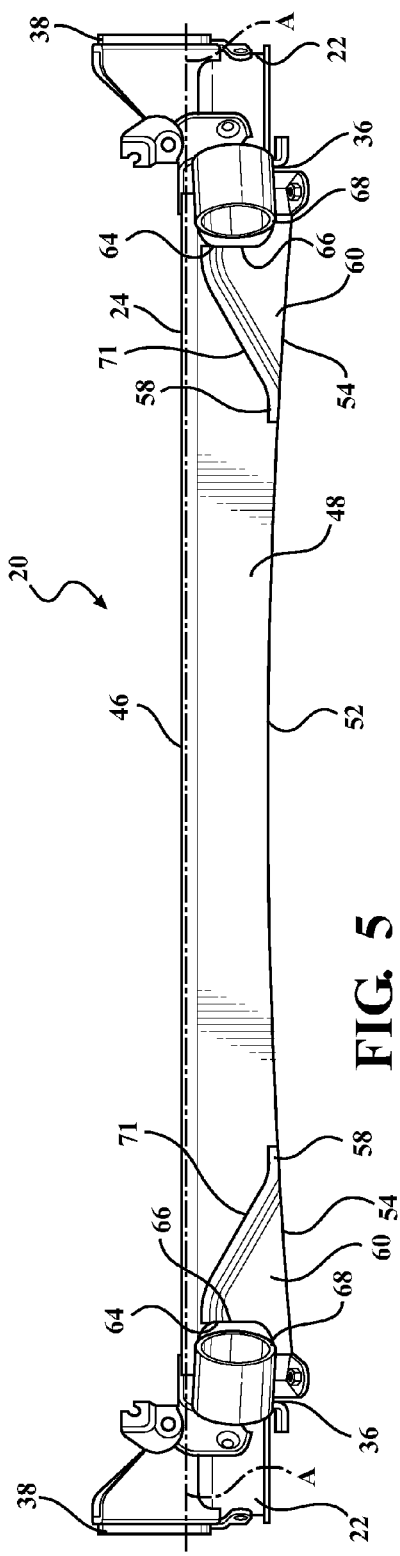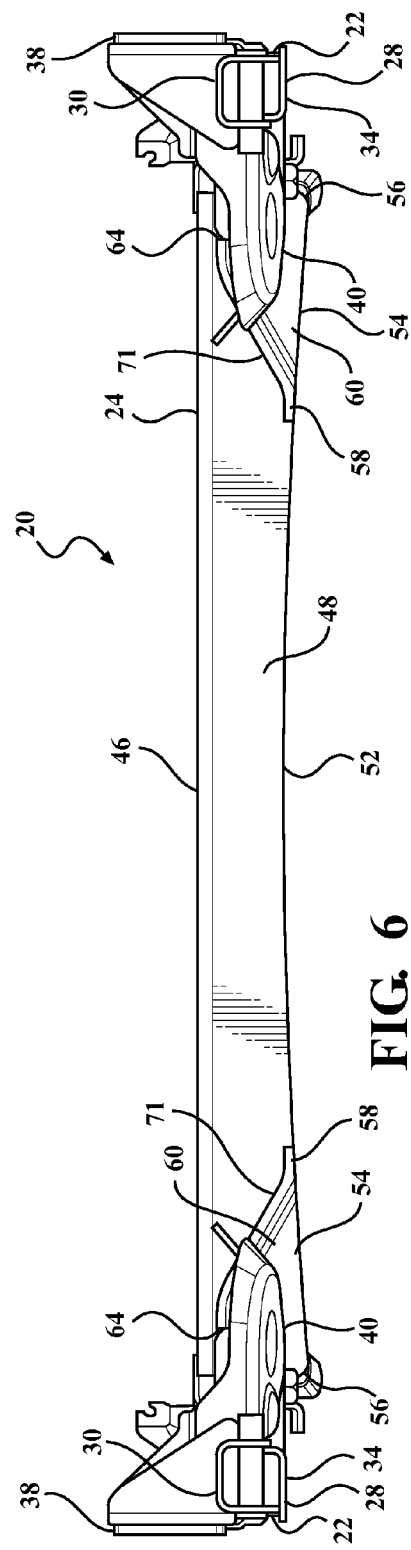

TWIST BEAM AXLE ASSEMBLY WITH LATERAL ADJUSTABILITY

CROSS REFERENCE TO RELATED APPLICATIONS

This U.S. National Stage Patent Application claims the benefit of PCT International Patent Application Ser. No. PCT/US2015/040475 filed Jul. 15, 2015 entitled "Twist Beam Axle Assembly With Lateral Adjustability," which claims the benefit of and priority to U.S. Provisional Patent Application Ser. No. 62/026,252 filed Jul. 18, 2014, the entire disclosure of the application being considered part of the disclosure of this application, and hereby incorporated by reference.

BACKGROUND OF THE INVENTION

1. Field of the Invention

The present invention relates in general to vehicle axles and more particularly to twist beam rear axle assemblies for vehicles.

2. Related Art

A twist beam rear axle suspension assembly, also known as a torsion beam axle, is a type of automobile suspension including a pair of trailing arms, each coupled with a wheel of a vehicle, and a twist beam extending transversely between the trailing arms. During operation of the vehicle, the twist beam deforms in a twisting movement when one of the wheels moves relative to another, for example during roll of the vehicle or when one of the vehicle's wheels encounters, for example, a pothole in the road. The twisting movement of the twist beam absorbs the movement.

Generally, such twist beams are welded directly to each of the trailing arms along multiple areas of the twist beam. For example, when a U-shaped twist beam is interconnected to the trailing arm, a weld is often used to secure the twist beam directly to the trailing arm assembly along a top wall, side walls, and/or a bottom wall of the trailing arm. If an O-shaped or C-shaped twist beam is interconnected to the trailing arm, a weld is used to directly secure the twist beam to the trailing arm along a circumference of the twist beam. However, manufacturing variations in the twist beam and/or the trailing arms can lead to challenges and problems when fitting these components together in preparation for the welding operation. In addition, these manufacturing variations can result in an unsatisfactory welded joint between the twist beam and the trailing arms, leading to fatigue and cracking of the welded joint between the twist beam and trailing arms after manufacture and assembly of the twist beam axle assembly.

SUMMARY OF THE INVENTION

One aspect of the present invention includes a twist beam axle assembly of a vehicle which includes a pair of trailing arms and a twist beam having a base portion extending along an axis A between first and second twist beam ends disposed in overlaying relationship with a respective trailing arm. The twist beam includes a pair of side walls extending downwardly from the base portion and each disposed in spaced relationship with the trailing arms. At least one mounting bracket extends from a first mounting bracket end disposed in abutting relationship with a respective trailing arm to a second mounting bracket end disposed in overlaying relationship with the side walls of the twist beam for allowing the mounting bracket to axially and/or vertically slip or slide along the side walls of the twist beam when the mounting bracket is initially mated with the trailing arms and the twist beam. As a result, the mounting bracket absorbs or accounts for any manufacturing variations of the trailing arms and twist beam in the axial or lateral and vertical direction, and thus leads to improved manufacturing flexibility of the subject twist beam axle assembly relative to prior art twist beam axle assemblies. Put another way, the mounting bracket provides for lateral or axial and vertical adjustment of the twist axle assembly during the manufacturing process.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 5 is a front view of the first embodiment of the twist beam axle assembly;

FIG. 6 is a rear view of the first embodiment of the twist beam axle assembly;

DETAILED DESCRIPTION OF THE ENABLING EMBODIMENTS

Figure 1:
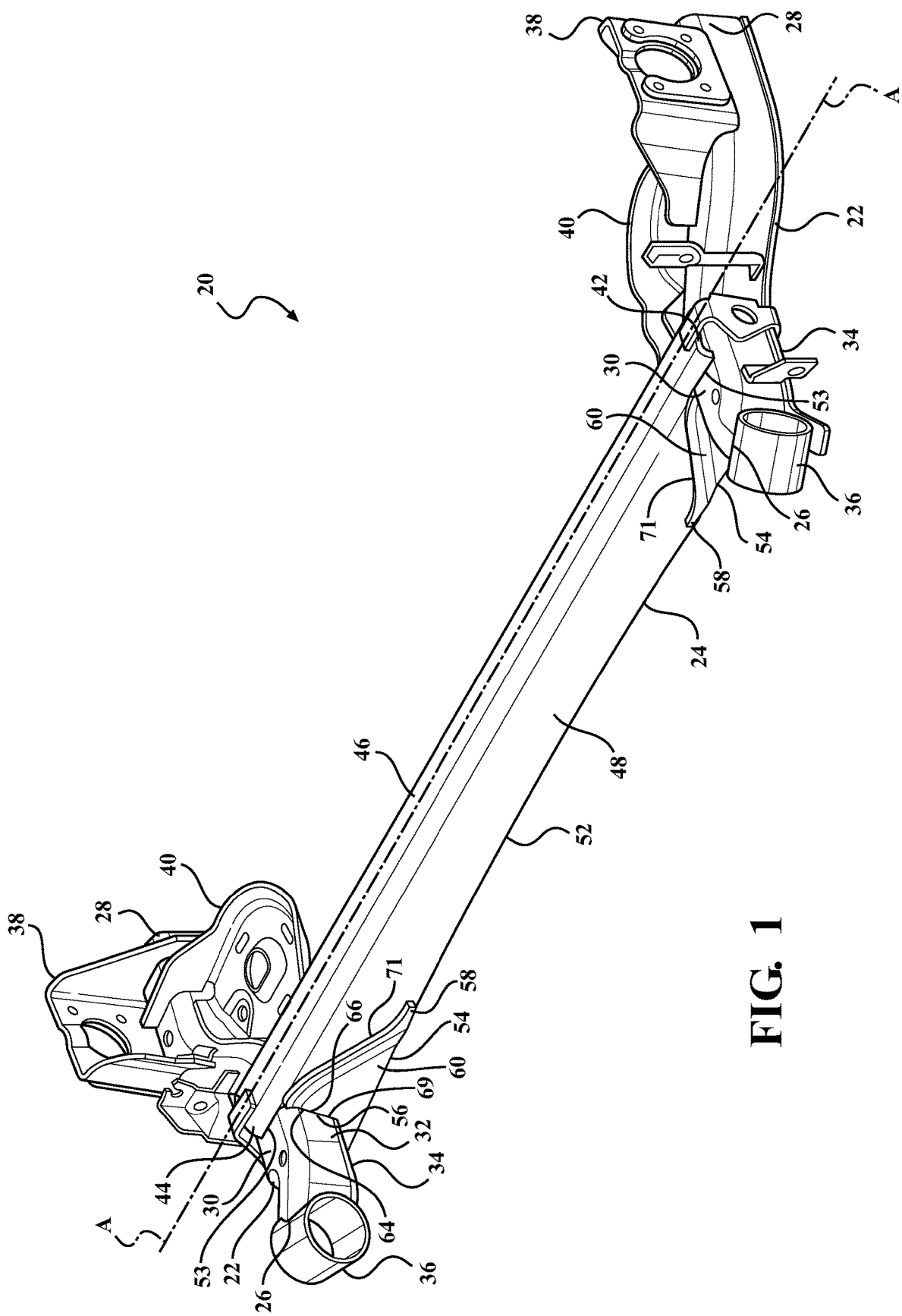
FIG. 1 is a perspective view of a first embodiment of the twist beam axle assembly.

Referring to the drawings, wherein like numerals indicate corresponding parts throughout the several views, an exemplary twist beam axle assembly 20 constructed in accordance with an aspect of the present invention is generally shown in FIGS. 1-12. As shown therein, the twist beam axle assembly 20 is a rear suspension assembly and includes a pair of trailing arms 22 attached to opposing ends of a transverse twist beam 24. The trailing arms 22 are formed as separate pieces from the twist beam 24 and, as will be described in more detail below, are subsequently joined or interconnected to the twist beam 24. The trailing arms 22 may be formed in a variety of sizes, shapes and configurations depending largely upon the vehicle in which the twist beam axle assembly 20 is to be placed.

As shown in the Figures, each trailing arm 22 extends between a first trailing arm end 26 and a second trailing arm end 28 to present a top portion 30, a side portion 32, and a bottom portion 34 of the trailing arms 22. An axle mounting member 36 is connected to the first trailing arm ends 26, with each axle mounting member 36 aligned with one another. A spindle bracket 38 is connected to the trailing arms 22 adjacent the second trailing arm ends 28. A spring bracket 40 is also connected to the trailing arms 22 adjacent the second trailing arm ends and the spindle bracket 38.

Figure 2:
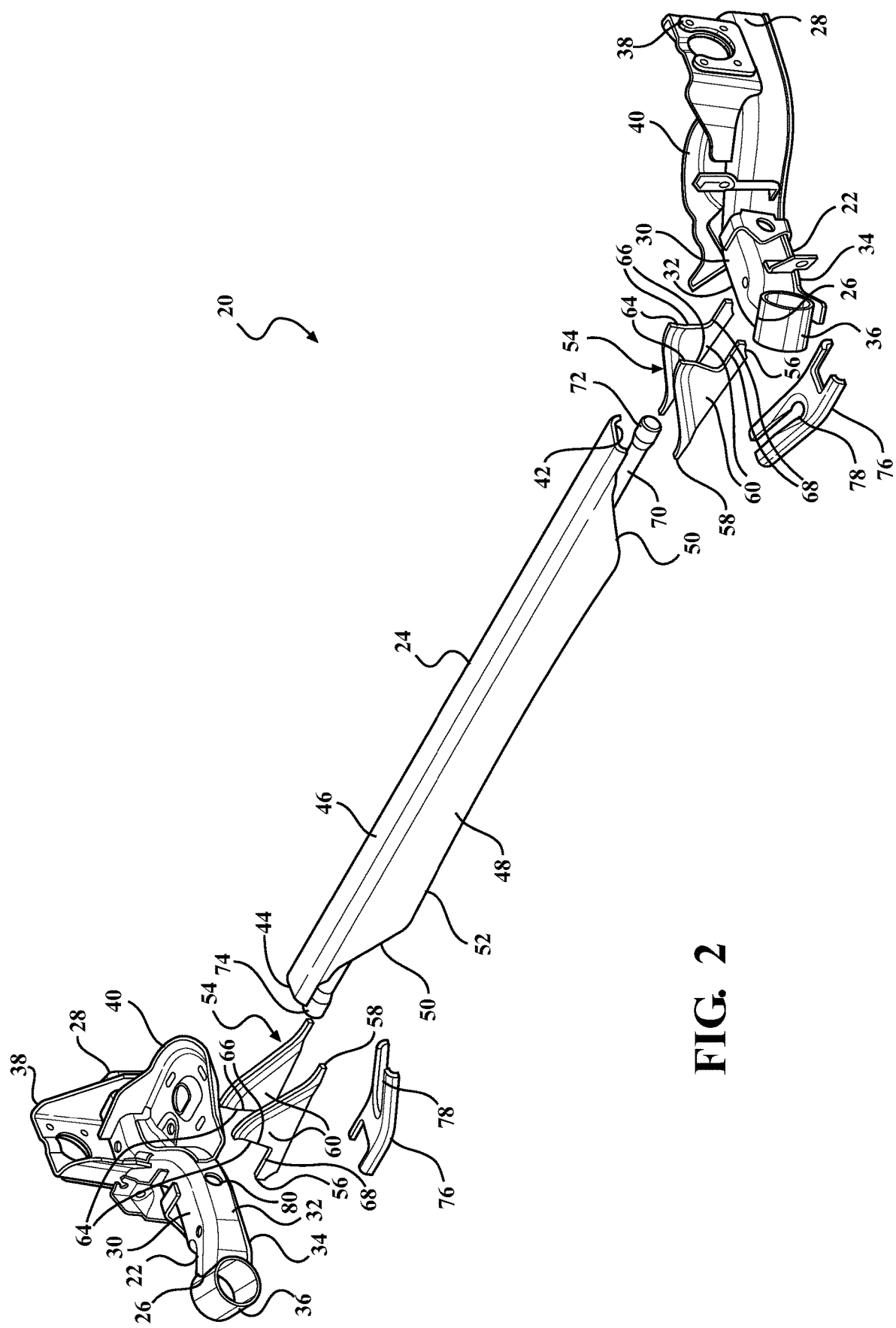
FIG. 2 is an exploded view of FIG. 1 illustrating the first embodiment twist beam axle assembly.
Figure 3:
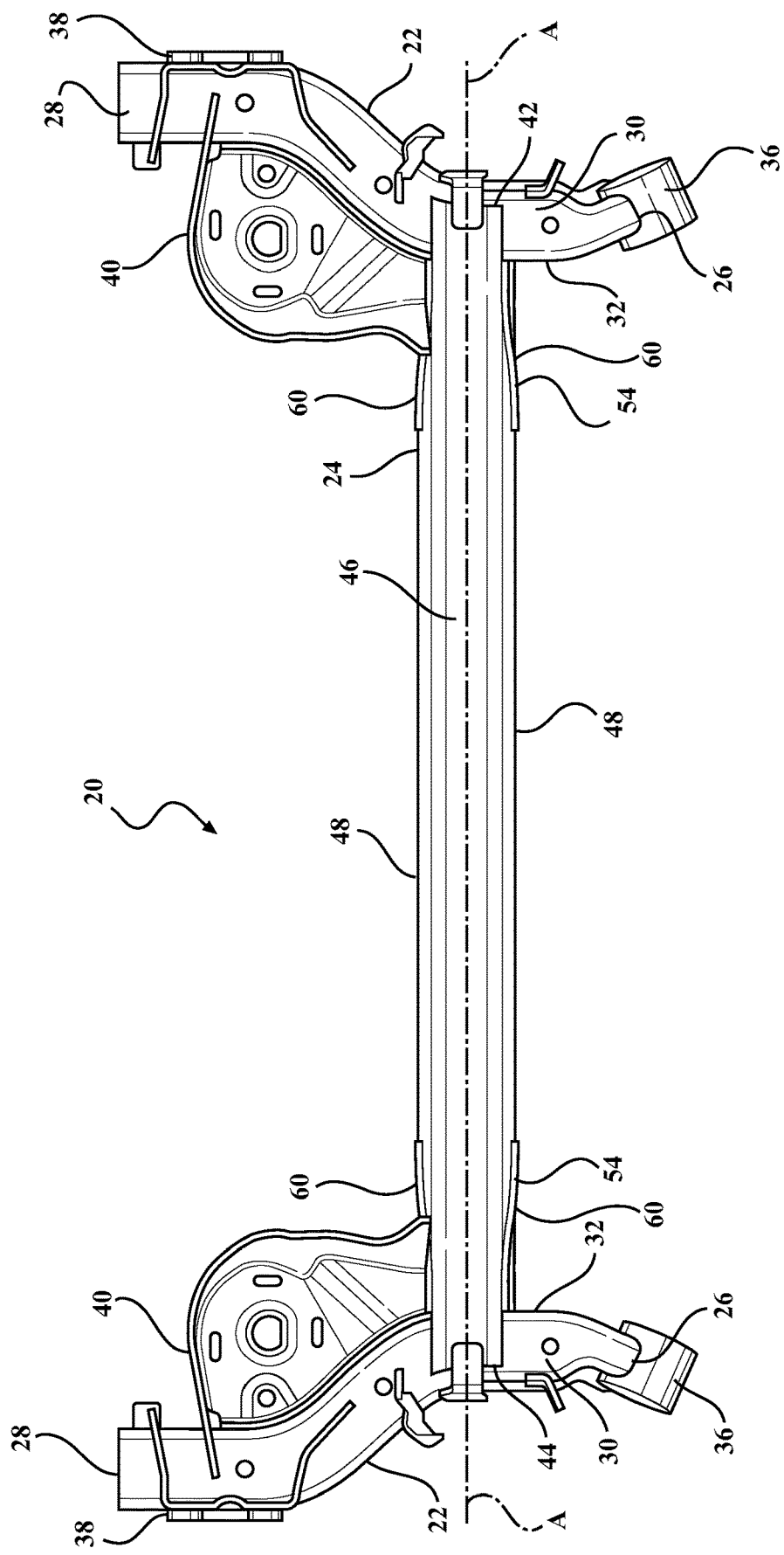
FIG. 3 is a top view of the first embodiment of the twist beam axle assembly.
Figure 7:
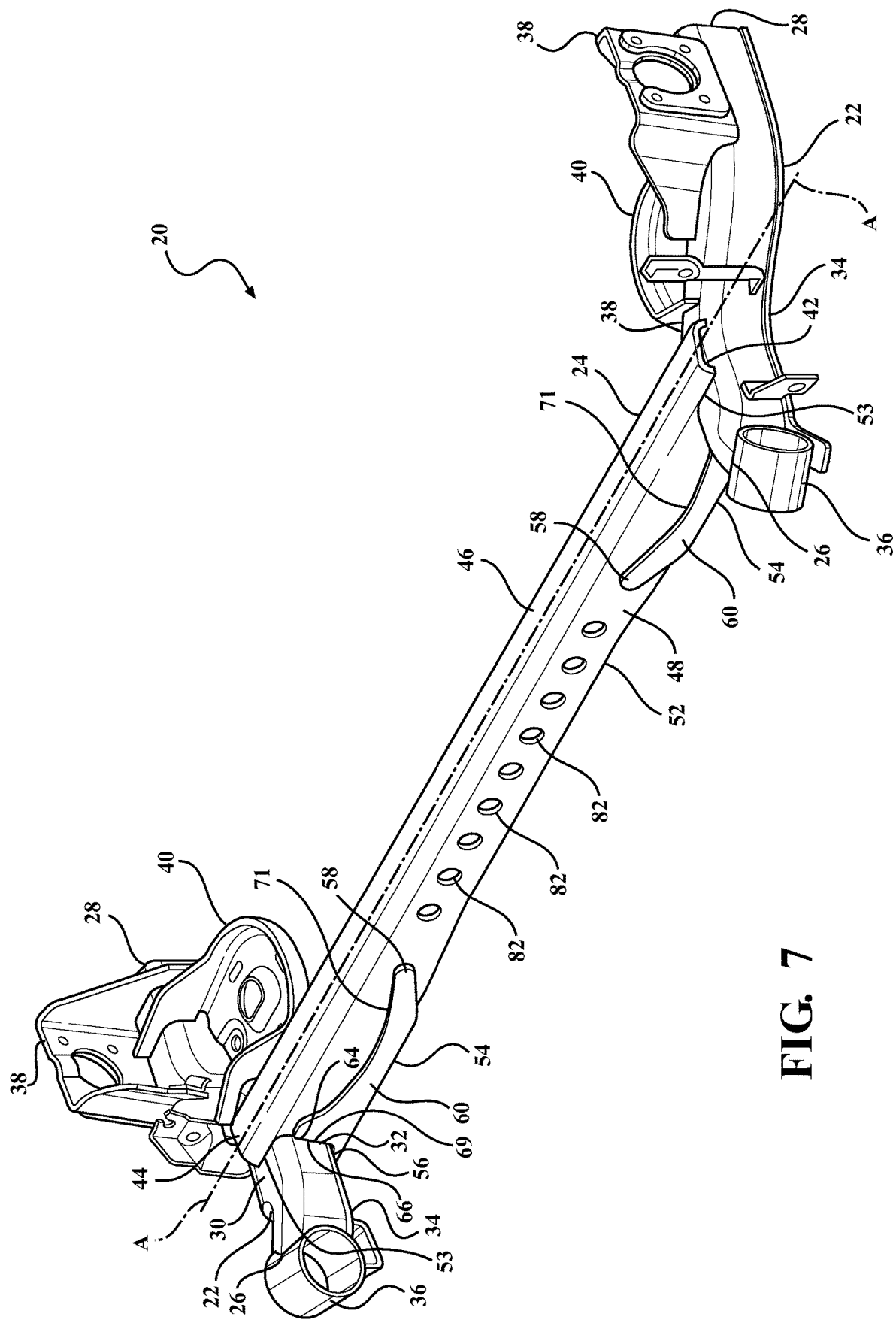
FIG. 7 is a perspective view of the second embodiment of the twist beam axle assembly.
Figure 8:
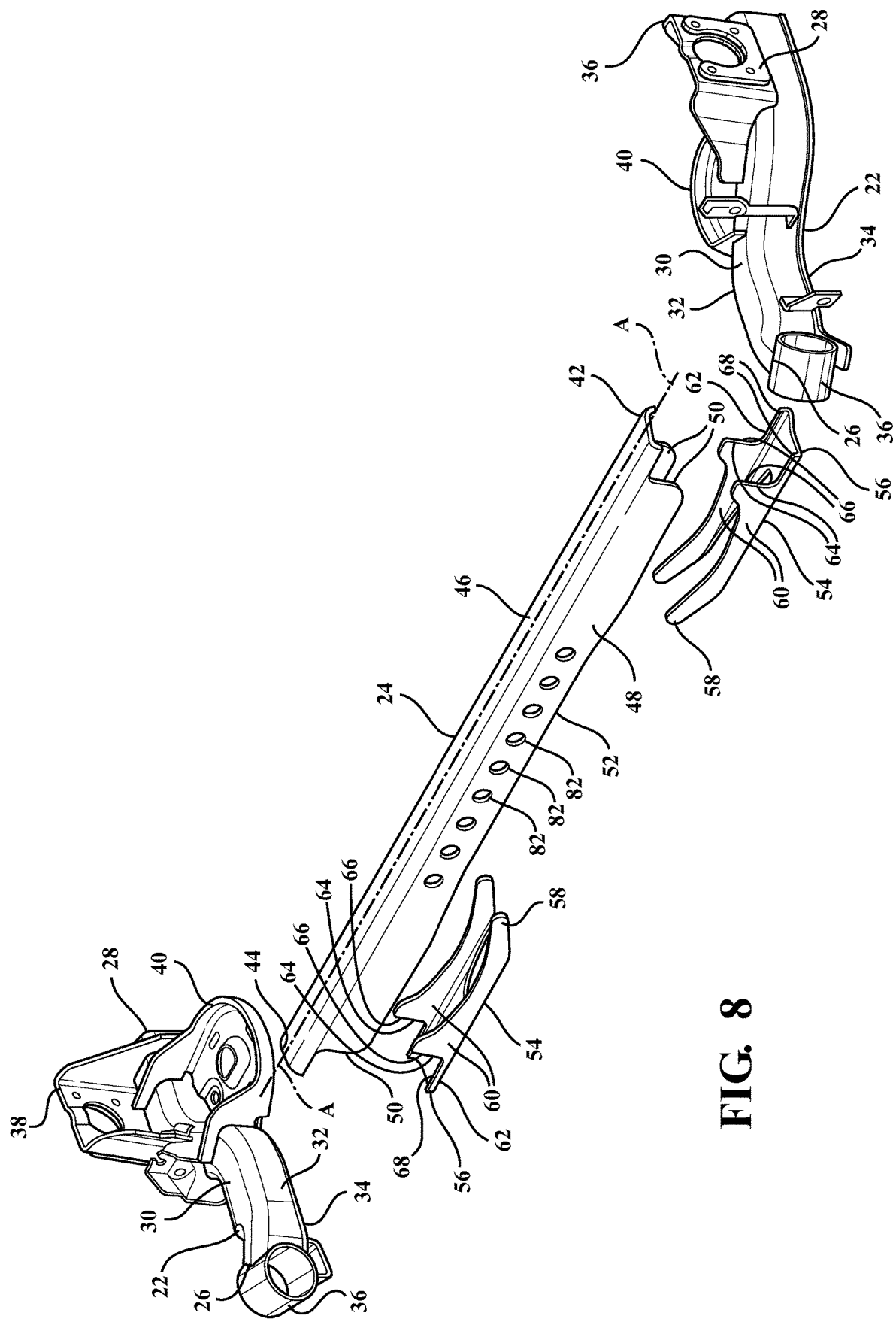
FIG. 8 is an exploded view of FIG. 7 illustrating the second embodiment of the twist beam axle assembly.
Figure 9:
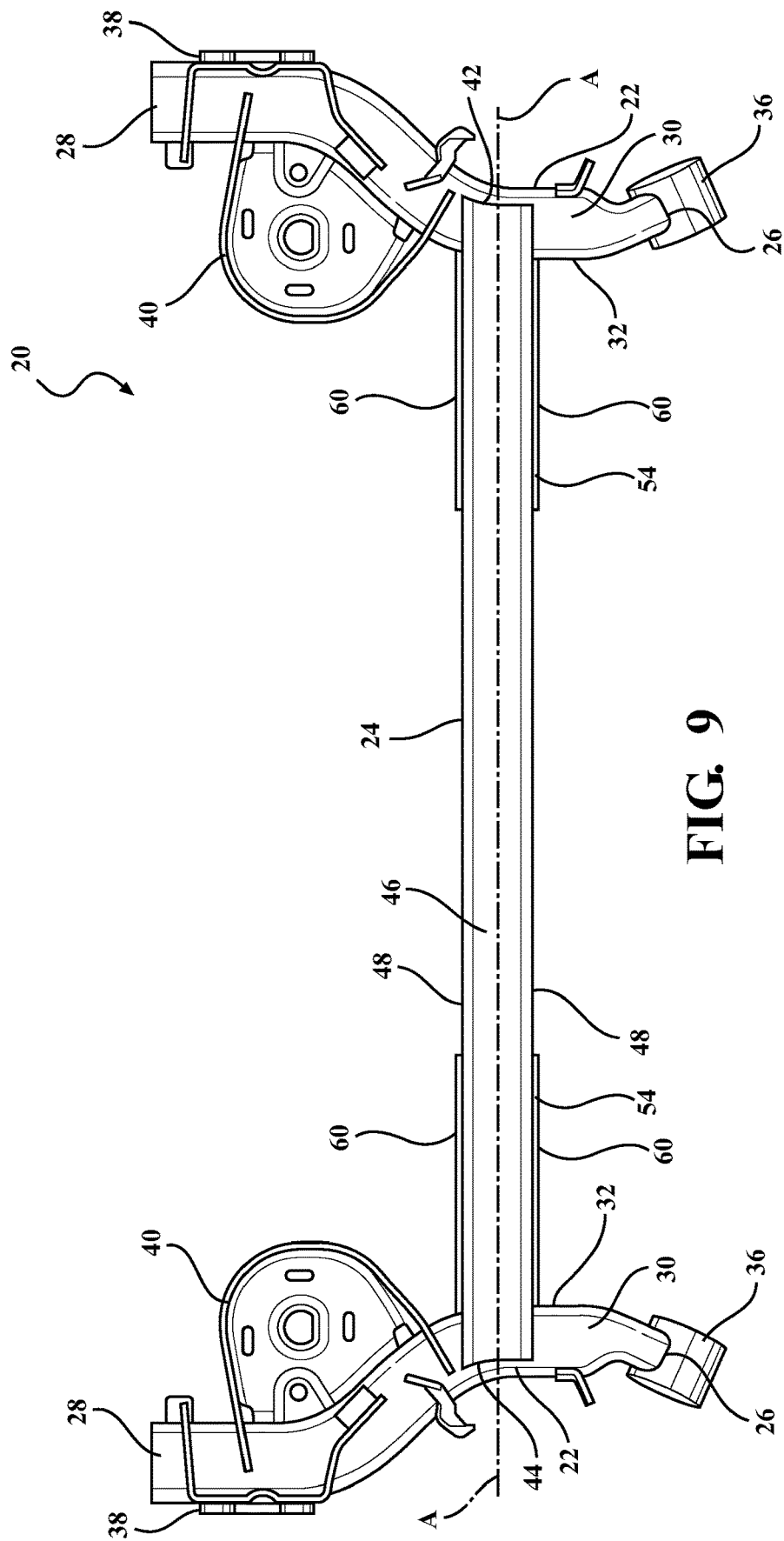
FIG. 9 is a top view of the second embodiment of the twist beam axle assembly.
Figure 10:
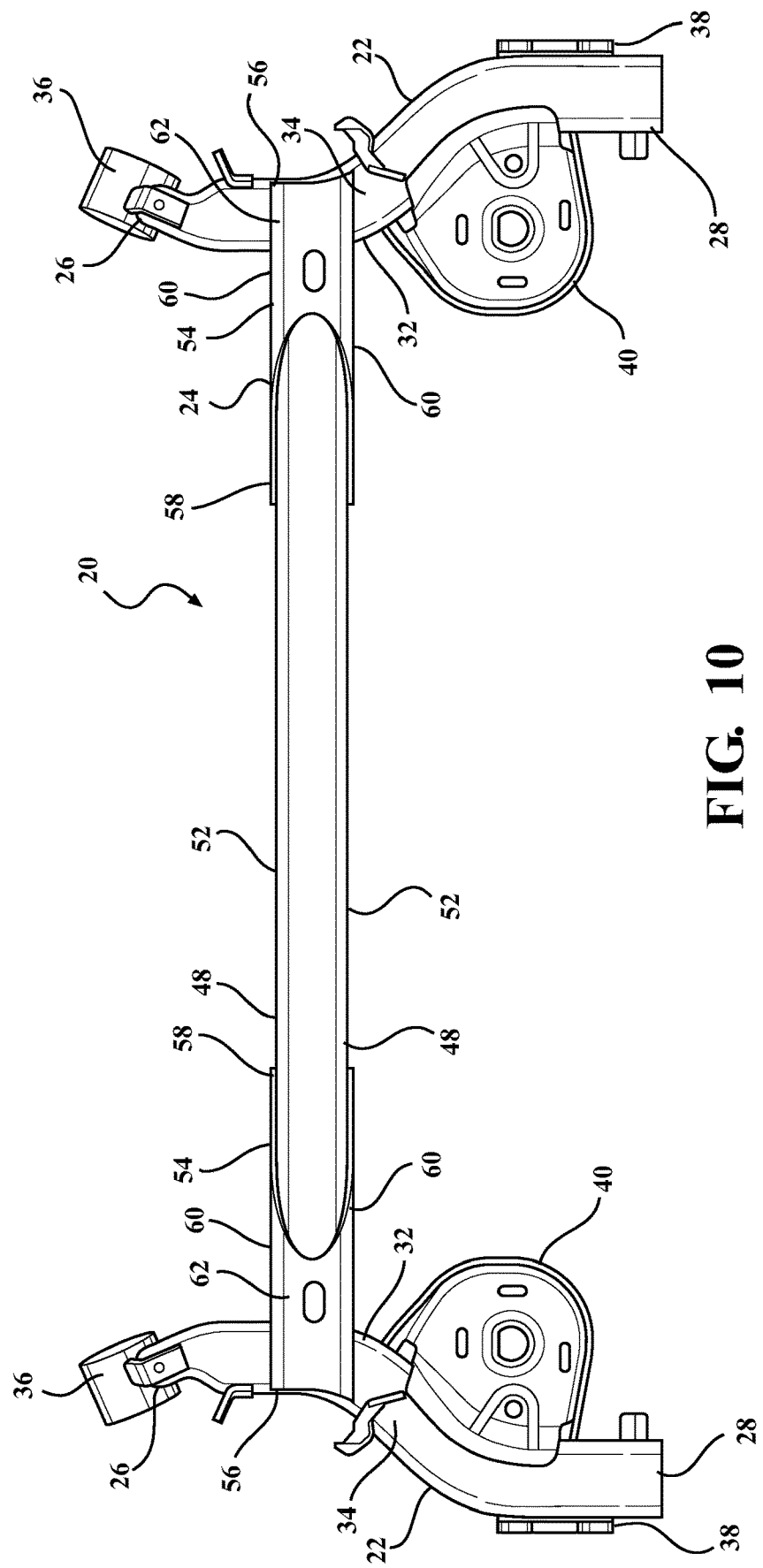
FIG. 10 is a bottom view of the second embodiment of the twist beam axle assembly.
Figure 11:
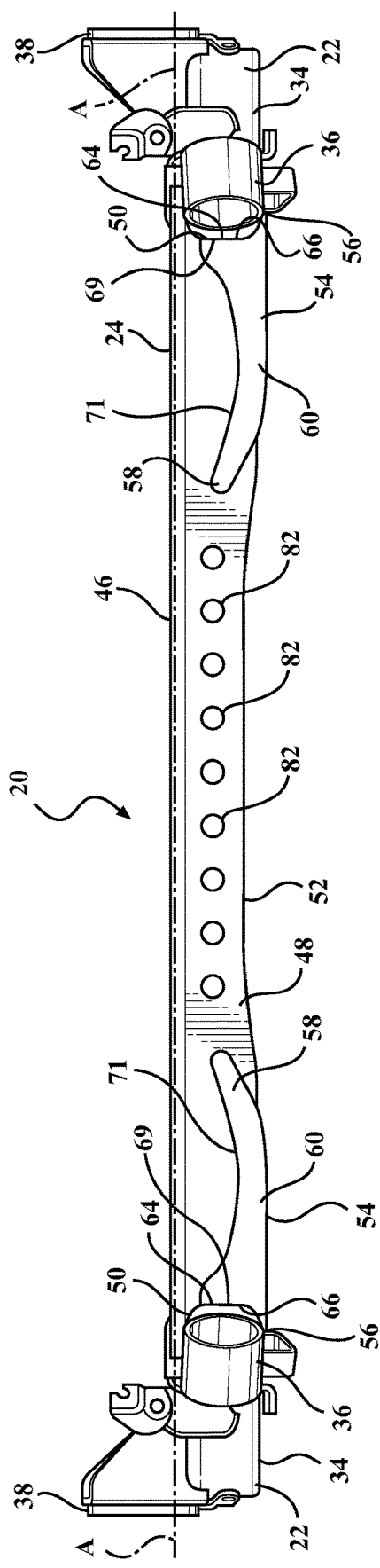
FIG. 11 is a front view of the second embodiment of the twist beam axle assembly.
Figure 12:
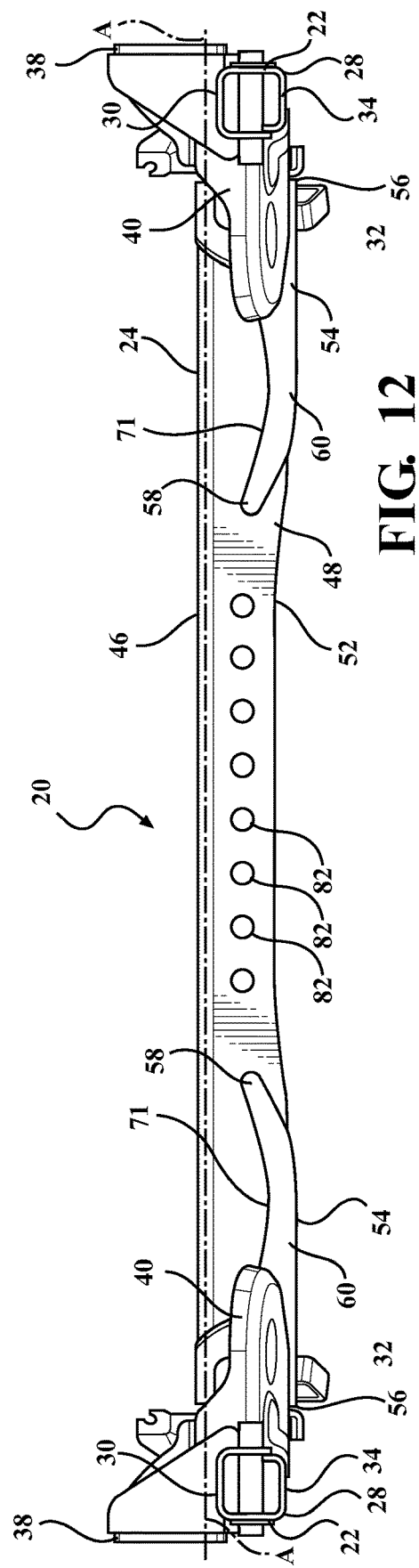
FIG. 12 is a rear view of the second embodiment of the twist beam axle assembly.

As best shown in FIGS. 2 and 8, the twist beam 22 extends along an axis A from a first twist beam end 42 to a second twist beam end 44. In a preferred embodiment, and as best shown in FIGS. 2 and 7, the twist beam 24 includes a base portion 46 presenting an arcuate shape which extends along the axis A from the first twist beam end 42 to the second twist beam end 44. The twist beam 24 includes a pair of side walls 48 each extending downwardly from the base portion 46 along a pair of side edges 50 to a bottom edge 52 such that the base portion 46 and the side walls 48 together present an inverted U-shaped cross section of the twist beam 24. As best shown in FIGS. 2 and 7, the side edges 50 of each side wall 48 are disposed in spaced relationship with the first and second ends 42, 44 of the twist beam 24. In a first embodiment of the twist beam axle assembly 20, as best shown in FIG. 2, the side edges 50 are tapered between the base portion 46 and the bottom edge 52. In a second embodiment of the twist beam axle assembly 20, as best shown in FIG. 7, the side walls 48 extend transversely or perpendicularly between the base portion 46 and the bottom edge 52. However, the side walls 48 of the twist beam 24 can also comprise a variety of different shapes and configurations without departing from the scope of the subject disclosure.

In either embodiment of the twist beam axle assembly 20, the base portion 46 of the twist beam 24 is disposed in overlaying relationship with the top portions 30 of the trailing arms 22 about the first and second twist beam ends 42, 44. This overlaying relationship of the twist beam 24 with the trailing arm 22 establishes a gap extending axially between the side walls 48 of the twist beam 24 and the side portions 32 of the trailing arms 22. Put another way, the side walls 48 of the twist beam 24 and the side portions 32 of the trailing arms 22 do not abut one another, but rather are disposed in spaced relationship, when the base portion 46 of the twist beam 24 overlays the top portion 30 of the trailing arm 22. This gap or spaced relationship accounts for any manufacturing variations of the trailing arms 22 and the twist beam 24 in the axial or lateral direction during the initial mating of the twist beam 24 with the trailing arms 22. As best shown in FIGS. 1 and 7, a first weld 53 extends along the first and second twist beam ends 42, 44 to secure the overlaid base portion 46 of the twist beam 24 with the top portion 30 of the trailing arms 22. As will be described in more detail below, this first weld is the only welded joint which extends directly between the trailing arms 22 and the twist beam 24 in the subject twist axle rear assembly 20. As a result, the subject twist beam axle assembly 20 provides for improved and more robust fatigue performance over the prior art twist beam axle assemblies which include multiple welded joints extending directly between the trailing arms and twist beam.

As best shown in FIGS. 1-2 and 7-8, the twist beam axle assembly 20 includes a pair of mounting brackets 54 each extending from a first mounting bracket end 56 disposed in abutting relationship with a respective trailing arm 22 to a second mounting bracket end 58 disposed in overlaying relationship with the side walls 48 of the twist beam 24 for covering or closing the gap that extends axially between the side portions 32 of the trailing arms 22 and the side walls 48 of the twist beam 24. The overlaying relationship of the mounting brackets 54 allows the mounting brackets 54 to axially slip or slide along the side walls 48 of the twist beam 22 when the mounting brackets 54 are initially mated with the trailing arms 22 and the twist beam 24 to absorb or account for the aforementioned manufacturing variations of the trailing arms 22 and twist beam 24 in the axial or lateral and vertical directions. The mounting bracket 54 thus leads to improved manufacturing flexibility of the subject twist beam axle assembly 20 relative to prior art twist beam axle assemblies.

As best shown in FIGS. 2 and 8, the mounting bracket 54 can include a pair of side plates 60 extending in spaced and parallel relationship to one another between the first and second mounting bracket ends 56, 58. As best shown in FIGS. 1 and 7, each of the side plates 60 are disposed in overlaying or abutting relationship with a respective side wall 48 of the twist beam 24 to effectuate the axially slip or slide of the mounting bracket 54 along the side walls 48 of the twist beam 22. As best shown in FIG. 8, in the second embodiment of the twist axle assembly 20, the mounting bracket 54 additionally includes a base plate 62 integral with the pair of side plates 60 and which extends transversely therebetween to maintain the spaced and parallel relationship of the side plates 60.

As best shown in FIGS. 2 and 8, each of the side plates 60 include a notch 64 disposed at the first mounting bracket end 56 which is L-shaped to define a vertical mounting surface 66 and a horizontal mounting surface 68 of the mounting bracket 54. As best shown in FIGS. 1, 5, 8, and 11, the vertical mounting surface 66 is disposed in abutting or nesting relationship with the side portion 32 of the trailing arms 22 and the horizontal surface 68 is disposed in abutting or nesting relationship with the bottom portion 34 of the trailing arms 22. The twist beam axle assembly 20 includes a second weld 69 which extends along the first mounting bracket end 56 to secure the side plates 60 of the mounting bracket 54 to the trailing arms 22 and a third weld 71 which extends along the second mounting bracket end 58 to secure the side plates 60 to the twist beam 24 once disposed in overlaying relationship therewith. In a preferred arrangement, the second weld includes a vertical portion extending along the vertical mounting surface 66 to secure the side plates 60 to the side portion 32 of the trailing arms 22 and a horizontal portion extending along the horizontal mounting surface 68 to secure the side plates 60 to the bottom portion 34 of the trailing arms 22. The second and third welds indirectly interconnect the trailing arms 22 and the twist beam 24 by way of the mounting brackets 54 to minimize the number of welding joints which extend directly between the twist beam 24 and the trailing arms 22. As a result, the twist beam axle assembly 20 provides for improved and more robust fatigue performance over the prior art twist beam axle assemblies which include multiple welded joints extending directly between the trailing arms and twist beam.

Figure 4:
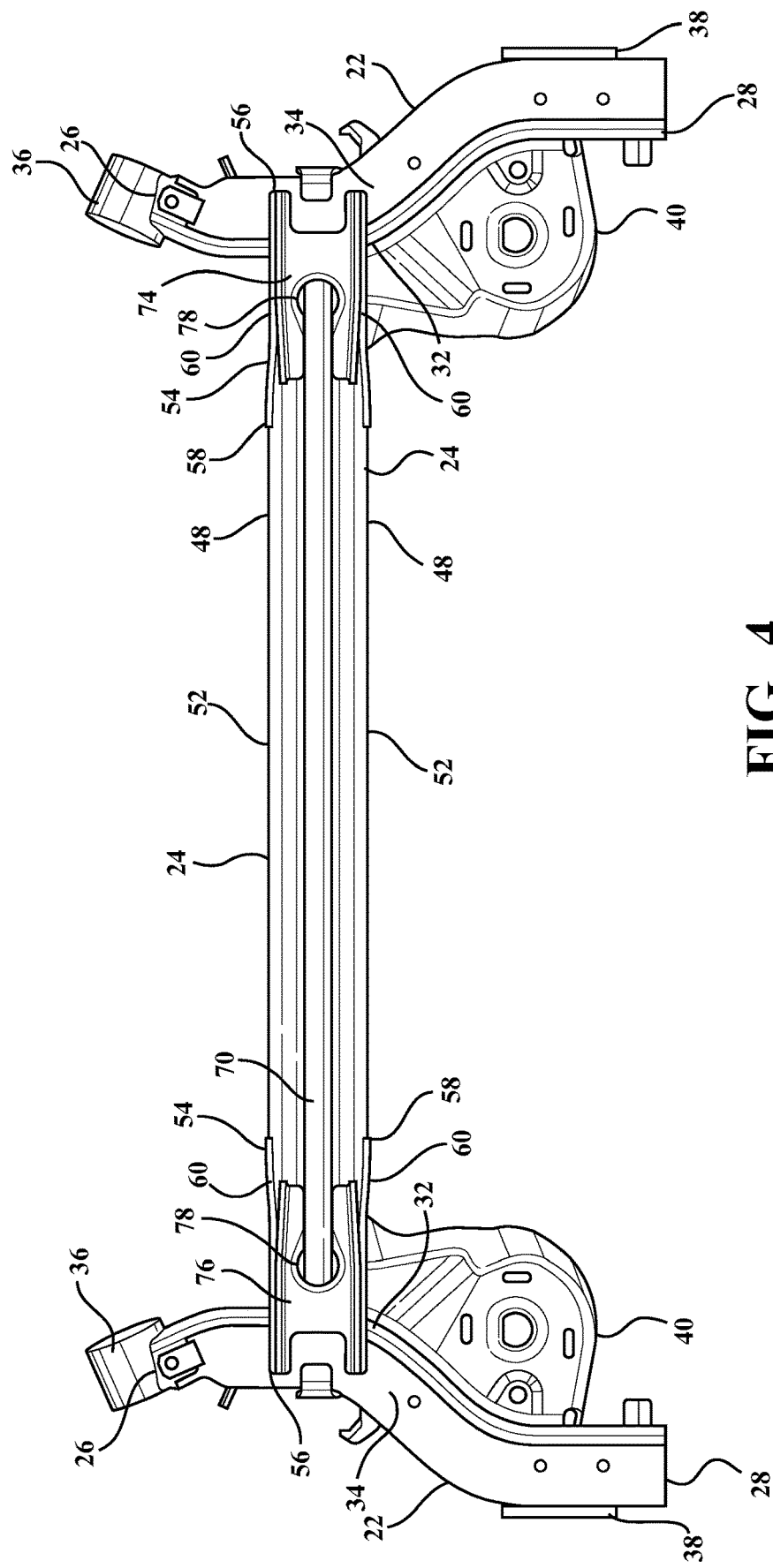
FIG. 4 is a bottom view of the first embodiment of the twist beam axle assembly.

As best shown in FIGS. 2 and 4, in the first embodiment of the twist axle beam assembly 20, a torsion bar 70 is disposed within the inverted U-shaped cross-section of the twist beam 24 and extends in spaced and parallel relationship along the axis A between a first torsion bar end 72 and a second torsion bar end 74. A pair of lower brackets 76 are attached to the side plates 60 of each mounting bracket 54 and extend into the U-shaped cross-section of the twist beam 24 to define an opening 78 through which each of the first and second torsion bar ends 72, 74 pass therethrough. Each of the trailing arms 22 additionally define a mounting orifice 80 into which a respective end 72, 74 of the torsion bar is aligned and mated to secure the torsion bar 70 to the twist beam rear axle assembly 20. As best shown in FIGS. 1-2 and 5, in the first embodiment of the twist axle beam assembly 20, each of the side plates 60 are tapered from the first mounting bracket end 56 to the second mounting bracket end 58 to complement the tapered shape of the side walls 48 of the twist beam 24.

As best shown in FIGS. 7-8 and 11-12, in the second embodiment of the twist axle beam assembly 20, each of the side plates 60 are U-shaped and overlay the side walls 48 of the twist beam 24 in concave relationship from the first mounting bracket end 56 to the second mounting bracket end. Additionally, the side walls 48 of the twist beam 24 defines a plurality of tuning holes 82 disposed in spaced relationship to one another for adjusting and tuning the torsional characteristics of the twist beam 24.

Obviously, many modifications and variations of the present invention are possible in light of the above teachings and may be practiced otherwise than as specifically described while within the scope of the appended claims.

What is claimed is:

1. A twist beam axle assembly of a vehicle, comprising:
a pair of trailing arms;
a twist beam having a base portion extending along an axis between first and second twist beam ends disposed in overlaying relationship with a respective trailing arm;
said twist beam including a pair of side walls extending downwardly from said base portion and disposed in continuously spaced relationship with said pair of trailing arms between said base portion and a bottom edge of said pair of side walls to define a gap extending axially between said side walls of said twist beam and said pair of trailing arms; and
at least one mounting bracket extending from a first mounting bracket end disposed in abutting relationship with one of said trailing arms to a second mounting bracket end disposed in overlaying relationship with said side walls of said twist beam to cover said gap.

2. A twist beam axle assembly as set forth in claim 1, wherein said at least one mounting bracket includes a pair of side plates each disposed in abutting relationship with a respective side wall of said twist beam and each extending from said respective side wall in spaced and parallel relationship to one another between said first and second mounting bracket ends.

3. A twist beam axle assembly as set forth in claim 2, wherein said at least one mounting bracket includes a base plate integral with and extending transversely between said pair of side plates to maintain said spaced and parallel relationship of said pair of side plates.

4. A twist beam axle assembly as set forth in claim 2, wherein each of said side plates include a notch disposed at said first mounting bracket ends in abutting or nesting relationship with a respective trailing arm.

5. A twist beam axle assembly as set forth in claim 4, wherein said pair of trailing arms each include a side portion and a bottom portion and said notch is L-shaped to define a vertical mounting surface disposed in abutting relationship with said side portion of a respective trailing arm and a horizontal mounting surface disposed in abutting relationship with said bottom portion of said respective trailing arm.

6. A twist beam axle assembly as set forth in claim 2, further comprising:
a first weld extending along each of said first and second twist beam ends to secure said overlaid base portion of said twist beam with said trailing arms.

7. A twist beam axle assembly as set forth in claim 6, further comprising:
a second weld extending along said first mounting bracket end to secure said at least one mounting bracket to said respective trailing arm; and
a third weld extending along said second mounting bracket end to secure said at least one mounting bracket to said pair of side walls for indirectly interconnecting said pair of trailing arms and said twist beam by way of said at least one mounting bracket to minimize a number of welding joints which extend directly between said twist beam and said pair of trailing arms.

8. A twist beam axle assembly as set forth in claim 2, wherein each of said side walls of said twist beam are tapered from said base portion to a bottom edge of said twist beam, and each of said side plates of said at least one mounting bracket are also tapered from said first mounting bracket end to said second mounting bracket end.

9. A twist beam axle assembly as set forth in claim 2, wherein each of said side walls extend transversely or perpendicularly from said base portion to a bottom edge of said twist beam.

10. A twist beam axle assembly as set forth in claim 9, wherein each of said side plates are U-shaped and overlay said side walls of said twist beam in concave relationship from said first mounting bracket end to said second mounting bracket end.

11. A twist beam axle assembly as set forth in claim 2, further comprising a torsion bar disposed between said pair of side walls and extending in spaced and parallel relationship along said axis between a first torsion bar end and a second torsion bar end.

12. A twist beam axle assembly as set forth in claim 11, further comprising a lower bracket attached to said pair of side plates and defining an opening for receiving said torsion bar therethrough.

13. A twist beam axle assembly as set forth in claim 12, where each of said trailing arms define a mounting orifice and said first and second ends of said torsion bar each are disposed in aligned and mating relationship with a respective mounting orifice to secure said torsion bar to said twist beam axle assembly.

14. A twist beam axle assembly as set forth in claim 1, wherein said base portion presents an arcuate shape.

15. A twist beam axle assembly as set forth in claim 1, wherein said at least one mounting bracket includes a pair of mounting brackets each extending from a first mounting bracket end disposed in abutting relationship with a respective trailing arm to a second mounting bracket end disposed in overlaying relationship with said side walls of said twist beam for allowing each of said pair of mounting brackets to axially slip or slide along said side walls of said twist beam when said pair of mounting brackets are initially mated therewith.

* * * * *